(12) United States Patent
Armellin et al.

(10) Patent No.: US 7,552,753 B2
(45) Date of Patent: Jun. 30, 2009

(54) TIRE FOR A VEHICLE WHEEL COMPRISING AT LEAST ONE SINGLE STRAND METALLIC REINFORCING CORD

(75) Inventors: Giancarlo Armellin, Nova Milanese (IT); Guido Riva, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 567 days.

(21) Appl. No.: 10/451,898

(22) PCT Filed: Dec. 14, 2001

(86) PCT No.: PCT/EP01/14779

§ 371 (c)(1),
(2), (4) Date: Nov. 13, 2003

(87) PCT Pub. No.: WO02/051652

PCT Pub. Date: Jul. 4, 2002

(65) Prior Publication Data

US 2004/0069394 A1  Apr. 15, 2004

Related U.S. Application Data

(60) Provisional application No. 60/259,210, filed on Jan. 3, 2001.

(30) Foreign Application Priority Data

Dec. 27, 2000 (EP) .................................. 00128557

(51) Int. Cl.
*B60C 9/00* (2006.01)
*B60C 9/18* (2006.01)
*B60C 9/22* (2006.01)
*D07B 1/06* (2006.01)

(52) U.S. Cl. ............................ 152/527; 57/200; 57/236; 57/311; 57/902; 152/451; 152/531; 152/533

(58) Field of Classification Search ................. 152/451, 152/527, 531, 533, 556
See application file for complete search history.

(56) References Cited

U.S. PATENT DOCUMENTS

| 4,057,956 | A | | 11/1977 | Tolle |
| 4,385,486 | A | | 5/1983 | Iwata et al. |
| 5,670,208 | A | | 9/1997 | Chikiri et al. |
| 5,863,368 | A | | 1/1999 | Perrin |
| 5,902,425 | A | * | 5/1999 | Armellin ............... 152/527 X |
| 6,062,284 | A | | 5/2000 | Caretta |

FOREIGN PATENT DOCUMENTS

EP  0 342 644 A2  *  11/1989

(Continued)

OTHER PUBLICATIONS

Masao, K., "Extrusion Cross-Head", Patent Abstracts of Japan, JP No. 03-000225, Jan. 7, 1991 (1 sheet).

*Primary Examiner*—Adrienne C Johnstone
(74) *Attorney, Agent, or Firm*—Finnegan, Henderson, Farabow, Garrett & Dunner, L.L.P.

(57) ABSTRACT

A tire for a vehicle wheel includes at least one metallic reinforcing cord comprising a single strand of elementary filaments preformed by sinusoidal waving and wound together. The number of filaments is greater than or equal to 3 and less than or equal to 8. A diameter of each filament is greater than or equal to 0.12 mm and less than or equal to 0.35 mm. A linear density of the at least one reinforcing cord is greater than or equal to 0.18 g/m and less than or equal to 4.0 g/m. A value of a breaking-stress integral of the at least one reinforcing cord is greater than or equal to 5,000 J/m$^3$. In a two-wheeled vehicle, the at least one reinforcing cord in a tire for front-mounting may be distributed with a variable density while, in a tire for rear-mounting, the density may be constant.

29 Claims, 5 Drawing Sheets

FOREIGN PATENT DOCUMENTS

| | | |
|---|---|---|
| EP | 0 461 646 B1 | 12/1991 |
| EP | 0 718 122 A1 | 6/1996 |
| EP | 0 950 546 A1 | 10/1999 |
| GB | 1 487 426 | 9/1977 |
| WO | WO 95/16816 | 6/1995 |
| WO | WO 99/28547 | 6/1999 |
| WO | WO 00/26465 | 5/2000 |
| WO | WO-00/39385 A1 * | 7/2000 |

* cited by examiner

TIRE FOR A VEHICLE WHEEL COMPRISING AT LEAST ONE SINGLE STRAND METALLIC REINFORCING CORD

CROSS-REFERENCE TO RELATED APPLICATIONS

This application is a national-phase entry under 35 U.S.C. § 371 from International Application No. PCT/EP01/14779, filed Dec. 14, 2001, in the European Patent Office, the contents of which are relied upon and incorporated herein by reference; additionally, Applicants claim the right of priority under 35 U.S.C. § 119(a)-(d) based on patent application No. 00128557.6, filed Dec. 27, 2000, in the European Patent Office; further, Applicants claim the benefit under 35 U.S.C. § 119(e) based on provisional application No. 60/259,210, filed Jan. 3, 2001, in the U.S. Patent and Trademark Office.

BACKGROUND OF THE INVENTION

1. Field of the Invention

The present invention relates to a tire for vehicle wheels, reinforced with metallic cords.

The invention is not restricted to a specific type of tire, but is particularly convenient when applied to tires for two-wheeled vehicles, because of their different behaviour during cornering.

2. Description of the Related Art

When travelling along a curved path, two-wheeled vehicles lean towards the inside of the curve at an angle, called "camber" angle, which can be as much as 65° to a plane which is vertical with respect to the ground; this manoeuvre gives rise to a (camber) thrust in the tires which opposes the centrifugal force acting on the vehicle.

As the velocity increases and the radius of curvature of the path decreases, the inclination of the vehicle alone is no longer sufficient to compensate for the effect of centrifugal force: it is therefore necessary to increase the thrust, and this is achieved by inclining the plane of rotation of the front tire with respect to the tangential direction of the curved path at an angle called the "slip angle", by a manoeuvre performed by the rider by means of the handlebars.

Thus the necessary increase in the slip thrust is obtained.

The rear tire, as is well known, is non-steering, and provides a smaller and qualitatively different thrust, namely one of the linear type, as opposed the curvilinear thrust of the front tire: the mutual combination of these two thrusts determines the attitude of the moving vehicle.

Since a two-wheeled vehicle is less stable than a four-wheeled vehicle, this specific behaviour of a two-wheeled vehicle makes it necessary for the vehicle to have better roadholding and superior manoeuvrability for the riding safety of the driver. In particular, it makes it necessary for the tires to offer high performance in terms of roadholding, stability of running, continuity and progressiveness of variation of the forces applied to the vehicle and exchanged between the tire and road.

The applicant has perceived that an increase in the velocity developed by the vehicle is accompanied by an increase in the importance of a further requirement, hereafter referred to as the "contact feeling", which can be defined as the reassuring sensation of managing of the vehicle transmitted by the tire to the rider, who thus becomes certain that the vehicle can adhere strictly to the required trajectory, without skips or "lifting" or any undesired movements, in all running conditions.

The "contact feeling" is closely related to the compliance of the tire to the footprint, intended as the capacity of the tire to adapt itself to the ground.

This requirement, which has not been perceived or given due consideration in the past, since it is of little significance at low velocities, is not adequately met by the tires available at present. One object of the present invention is therefore to provide tires, particularly for fitting to two-wheeled vehicles, which can transmit a high contact feeling to the rider.

The modern technology for manufacturing high-performance motorcycles, serially-produced models of which can achieve speeds of more than 300 km/hr, requires, in order to achieve this performance, not only suitable propulsions, but also a reduction of the total weight of the vehicle, attainable by making the tyres lighter, too.

The reduction of the weight of a tire has a further advantage. The tire is one of the so-called non-suspended masses, i.e. one of the parts which move as the wheels move, together with, for example, the rims, suspensions, brake discs and transmission chains. The reduction of the weight of the non-suspended masses not only makes the vehicle lighter but also improves its driving characteristics.

A further object of the present invention is therefore to provide tires, particularly for fitting to two-wheeled vehicles, which are lighter than current tires but have equal performance.

One way of decreasing the weight of a tire is to lighten the metallic reinforcing cords; in tires for two-wheeled vehicles, this approach is particularly advantageous, since the metallic cords of the ply are the heaviest part of the structural elements of the tire, and are located on its greatest circumference. A reduction of their weight not only decreases the weight of the tire, but also reduces its inertial moment, and consequently the behaviour of the tire improves both because of the reduction of the weight itself and because of the position where this reduction is achieved.

The use of metallic cords in reinforcing structures of tires is now well known and does not require detailed explanation; in any case, information useful for the understanding of the invention will be provided in the remainder of this description.

A metallic cord generally consists of a plurality of elementary filaments wound together in various geometrical configurations, made stable by means of a suitable permanent deformation, of the bending type at least, carried out on the aforesaid filaments, and by means of the said geometrical configuration.

The metallic cords designed for reinforcing articles having an elastomeric matrix, such as tires, must have characteristics of high penetrability of rubber among the constituent filaments, and of considerable structural strength to provide good performance by the article in use.

At the present time, some types of tires produced by the Applicant use a belt system consisting of a spiral arrangement of at least one metallic cord. The cord consists of strands which in turn consist of elementary filaments. For example, the 3×4×0.20 HE HT cord is a cord consisting of three strands, each consisting of four filaments having a diameter of 0.20 mm each.

This type of cord allows good penetration of rubber among the strands, but low, and sometimes zero, penetration of rubber into the interior of each strand.

The symbol HE means "High Elongation" and indicates that the winding of the filaments in the strands and of the strands in the cord is done in the same direction (the so-called Lang's lay structure). Additionally, the winding is such that it allows small movements of the strands with respect to each other. Thus the finished cord essentially acquires its own specific load-elongation diagram which shows a significant change of slope (knee) in the values of elongation when a particular load is reached. In particular, the initial portion of the diagram shows very consistent elongations for small variations of load, and is connected, via the knee, to the final portion of the diagram which shows very small elongations for consistent variations of load. A cord of this type is described in EP-B-461 646 in the name of the Applicant. The mid-knee value determines the correct assembly and moulding of the tire. For this purpose, it is preferably in the range from 0.4% to 1% of the elongation. This type of cord has proved its usefulness for moulding tires with radial carcass, particularly motorcycle tires.

The symbol HT means "High Tensile" and indicates a very small breaking load, for the filaments of the cord, of about 850 N (measured by the method of BISFA-E6 "Breaking load and elongation at break", BISFA-"Internationally agreed methods for testing steel tyre cord", Ed. BISFA, 4th Avenue E. Van Nieuwenhuyse, B1160 Brussels, Belgium). This is dependent, inter alia, on the percentage of carbon in the st el forming the filaments of these cords; in the case in question, this percentage is greater than 0.8%.

These cords are particularly applicable, for example, as reinforcing elements in the radially outermost belt layer of certain tires where they are laid at a substantially null angle of (0°) to the circumferential direction of the tire.

Recently, cords in which at least one of the constituent filaments is deformed by angular waving ("crimped") or by sinusoidal waving have been proposed for use in tires. An example is described in patent application WO 95/16816 (in the name of N. V. Bekaert S. A.), according to which the filaments are stranded together in a loose way so that the penetrability of the cord is increased, and are preferably waved with a polygonal rather than sinusoidal configuration.

In this context, WO 99/28547 (in the name of N. V. Bekaert S. A.) relates to a cord of the type described above, characterized in that at least one of the constituent filaments is provided with a first crimp in one plane and a second crimp in a plane substantially different from the plane of the first crimp. These cords, particularly in the single-strand version, have no substantial links among the constituent filaments, and are geometrically irregular, non-uniform and unstable.

WO 00/26465, in the name of the Applicant, claims cords characterized in that the filaments show a deformation by sinusoidal waving in a single plane.

The term "deformation by sinusoidal waving" denotes that the filament is deformed uniformly with a wavelike pattern without sharp angles in the three spatial planes.

In order to reduce the weight of a cord, it is necessary to reduce the diameter and/or the number of the filaments, but this implies a reduction of the breaking load of the cord. For a 40% decrease in weight, an HE HT cord shows an substantially equivalent reduction of the breaking load. This reduction of the breaking load is unacceptable in tire technology, in which the tire structure has its constituent materials (mixtures and reinforcing elements) located only where they are useful and only in the quantities which are strictly necessary for the purpose which they serve.

Moreover, the reduction in the filament diameter makes it impossible in practice to produce a cord with an acceptable "knee" to permit the processing and, especially, the moulding of the tire: this is due to the fact that, as the filament diameter decreases, it becomes more difficult to impart, during the cord production process, the permanent deformations which determine the final properties of the cord.

When faced with the above problem, a person skilled in the art knows that it is not possible to modify the known HE HT cords, because a reduction in weight due to the reduction in the diameter and/or the number of the filaments, as stated above, compromises the ability to process the tire and in any case decreases the safety factor of the product below the acceptable limits.

The use of cords with waved filaments as described above appears to be difficult to envisage, since the irregular, non-uniform and unstable geometry due to their structural characteristics, and the corresponding load-elongation diagram, do not appear to be capable of meeting the conditions for processing and practical use of the tire.

SUMMARY OF THE INVENTION

It has now been surprisingly found that a cord which has all its filaments sinusoidally waved can advantageously be used in the assembly of tire carcass, if the processes of rubberizing it and laying it on the carcass are modified, and this can be done without compromising the production process and even with an improvement in the quality of the finished product.

In particular, the tire reinforced with the cords according to the present invention has not only a lower weight, but also, and unexpectedly, a higher safety factor due to the unforeseen breaking strength of the reinforcing cords.

Moreover, the performance in tires, particularly. in those for two-wheeled vehicles, is improved, especially in respect of the "contact feeling" characteristic.

The present invention relates to a tire for vehicle wheels, comprising metallic reinforcing cords made of a single strand of elementary filaments preformed by sinusoidal waving and wound together, said metallic cords comprising the following characteristics:

a) a number of filaments in the range from 3 to 8;
b) a diameter of each said filament in the range from 0.12 mm to 0.35 mm;
c) a linear density in the range from 0.18 to 4.0 g/m;
d) a value of the integral of the breaking stress not lower than 5000 $J/m^3$.

Preferably, the tires are tires for two-wheeled vehicles.

Advantageously, such tires are provided with a belt structure comprising metallic cords with the previously quoted characteristics, arranged at a substantially null angle to the equatorial plane of the tire.

The filaments of the cords according to the invention are preformed by bending and, if a double bend is not made in different planes, by torsion as well.

Preferably, the cords according to the present invention comprise 5 filaments, each having a diameter in the range from 0.20 to 0.30 mm, and more preferably equal to 0.25 mm.

Here and in the following text, it is specified that the term "linear density" denotes the weight per meter of cord, measured in the cord "as such", i.e. as it leaves the stranding machine, before rubberizing, and measured by weighing a specimen 5 m long with a precision balance accurate to 0.01 g.

In the preferred embodiments, the diameter of the cord is in the range from 0.3 mm to 1 mm. Preferably, the diameter is measured in a portion of cord with a length of 100 mm, at 3 separate points. The distance of each of the two lateral positions from the corresponding end of the portion is preferably greater than 15 mm, to avoid the effect of fraying due to the cutting of the portion. The diameter value is the mean of the two values determined, in each position, by two measurements made at 90° to each other.

Preferably, the denseness is in the range from 30 to 100 cords per decimeter, measured at the crown of the tire, in the area lying across the equatorial plane.

Preferably, where tires for two-wheeled vehicles are concerned, the maximum denseness is of the order of 6 cords per centimeter in front tires and 10 cords per centimeter in rear tires.

In a second aspect, the invention relates to a tire belt comprising at least one metallic reinforcing cord, consisting of elementary filaments preformed by sinusoidal waving and wound together, characterized in that the cord has the characteristics described above.

In a third aspect, the present invention relates to a pair of tires for two-wheeled vehicles, reinforced by a belt comprising at least one radially outer layer formed by a plurality of axially adjacent circumferential turns of a cord wound at substantially null angle to the equatorial plane of the tire, characterized in that the said cord comprises the following characteristics:
  a) a number of filaments in the range from 3 to 8;
  b) a diameter of ach said filament in the range from 0.12 mm to 0.35 mm;
  c) a linear density in the range from 0.18 to 4.0 g/m;
  d) said reinforcing cords having a value of the integral of the breaking stress not lower than 5000 J/m$^3$;
in the belt structure of the front tire, said cords are distributed axially with a maximum denseness of 6 cords/cm;
in the belt structure of the rear tire, said cords are distributed axially with a maximum denseness of 10 cords/cm.

Preferably, said cords are distributed axially with a denseness in the range from 2 to 6 cords/cm in the belt structure of the front tire. Preferably, said front tire, according to the present invention, has cords distributed with a variable denseness, in particular with a denseness progressively increasing from the equatorial plane towards the sides of the belt.

Preferably, said cords are distributed axially with a maximum denseness of 8 cords/cm in the belt structure of the rear tire. Preferably, said rear tire, according to the present invention, has cords distributed axially with a constant denseness.

In a fourth aspect, the present invention relates to a two-wheeled vehicle comprising a pair of tires as defined above.

In a fifth aspect, the present invention relates to a rubberized fabric comprising reinforcing cords as defined above.

BRIEF DESCRIPTION OF THE DRAWINGS

Further aspects and advantages of the present invention will be made clear by the following drawings which illustrate the invention but do not limit it. In the drawings.

DETAILED DESCRIPTION OF THE EMBODIMENTS

Figure 1B:
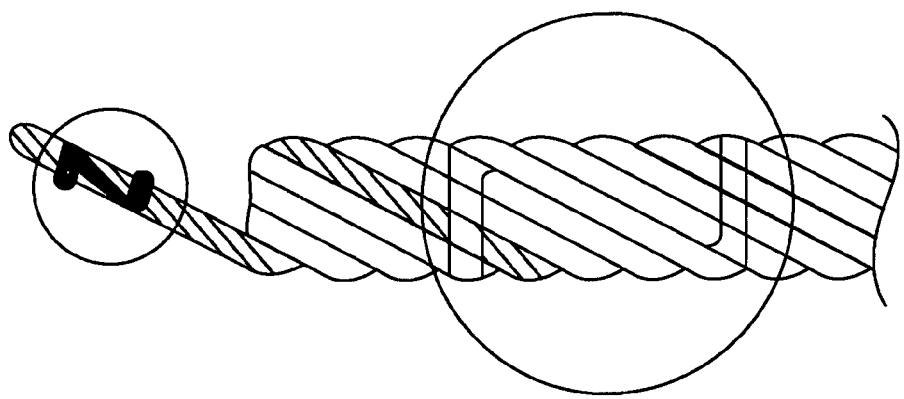
FIGS. 1a and 1b show examples of cords in the Lang's lay configuration.
Figure 1A:
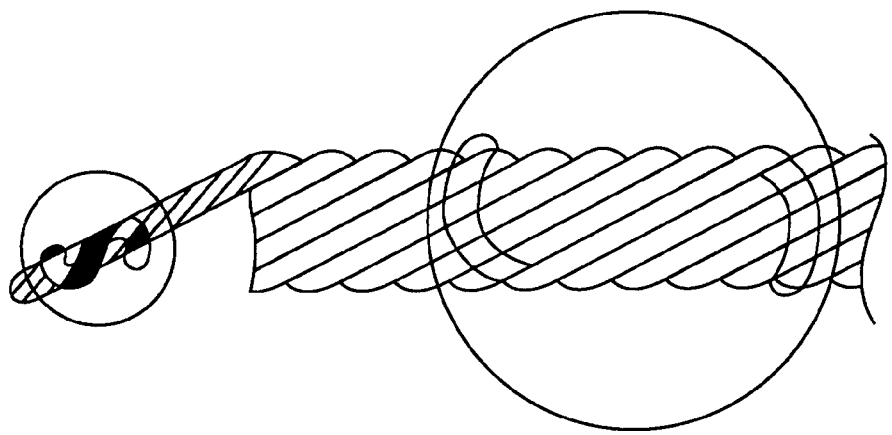
Figure 2A:
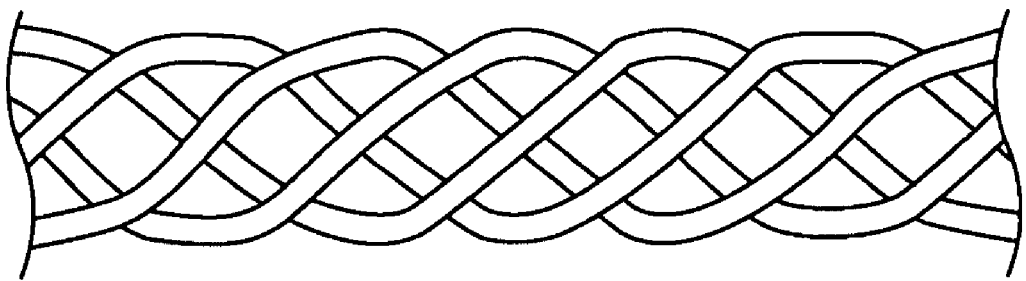
FIG. 2a shows a cord according to the prior art, having at least one of the constituent filaments deformed by waving with sharp angles ("crimped")
Figure 2B:
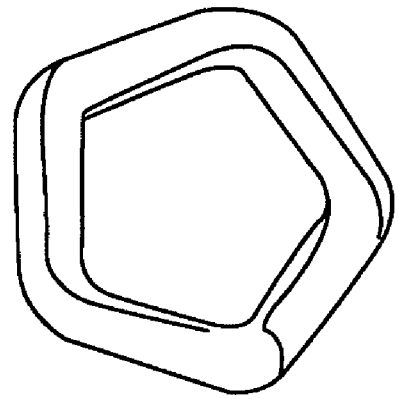
FIG. 2b shows a perpendicular cross section of one of the filaments of the cord of FIG. 2a, waved in a polygonal configuration.
Figure 3:
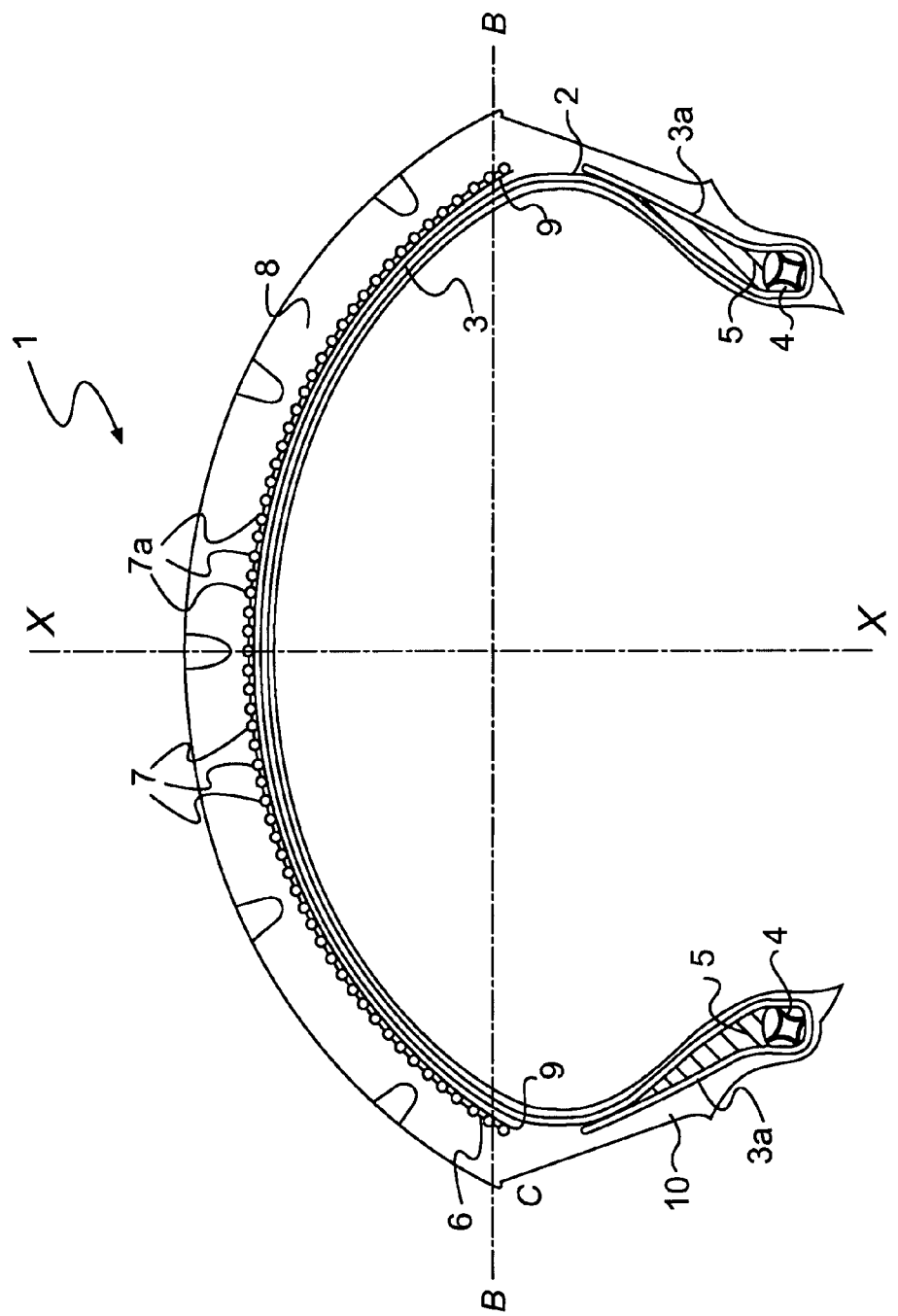
FIG. 3 shows, in cross section, the profile of a tire according to the invention.
Figure 4:
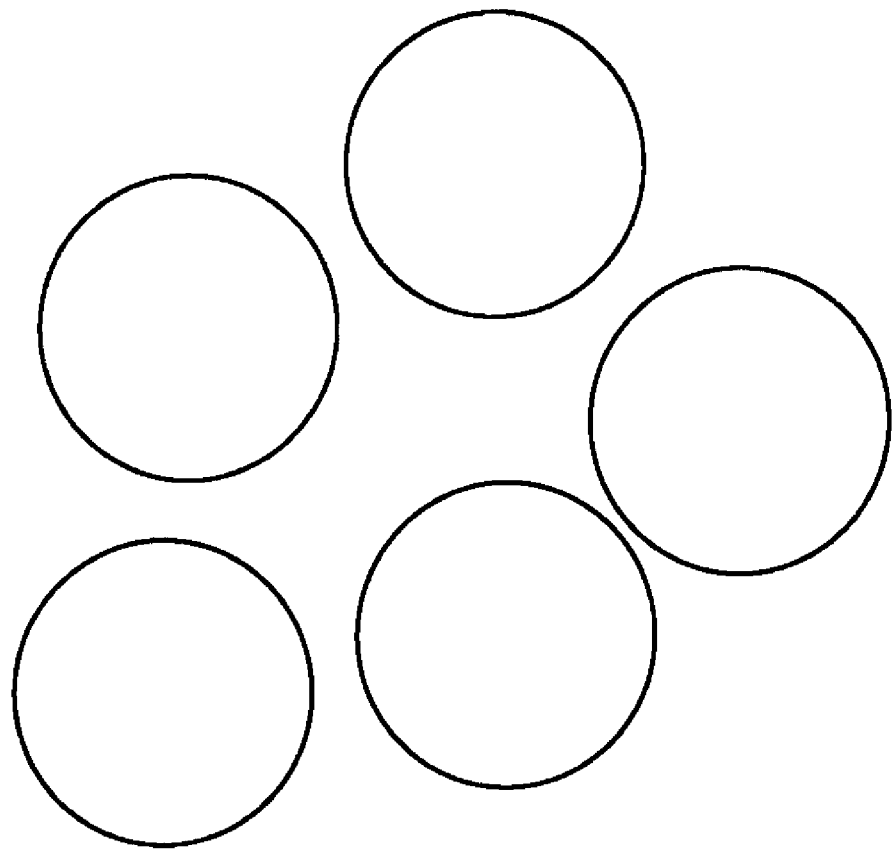
FIG. 4 shows, in cross section, a 5×0.30 cord according to the invention.

In particular, FIG. 3 shows, in cross section, the profile of a tire made according to the present invention.

1 indicates the whole of a tire with a high transverse curvature, particularly for motor vehicles, according to the present invention.

The tire 1 has a carcass structure 2 comprising at least one carcass ply 3 whose opposing lateral edges 3a are associated with corresponding fixing bead wires 4, and in this particular case being wound axially from the interior towards the exterior around these bead wires.

On the outer perimetric edge of the bead wires 4 there is applied an elastomeric filler 5 which, in this particular case, occupies the space formed between the carcass ply 3 and the corresponding turned-over lateral edge 3a, but which, in general, occupies any space formed within the bead 10.

The carcass structure 2 is associated with a belt structure 6 which essentially consists of at least one cord 7 extending circumferentially on the crown of the carcass ply 3 to form a plurality of parallel and consecutively adjacent turns 7a, substantially orientated along the rolling direction of the tire 1.

Because of their substantial longitudinal inextensibility acquired during vulcanization, the turns 7a, which are consecutively adjacent along a curved profile, impart a structural and dimensional stability to the tire 1, according to the desired profile of transverse curvature.

The transverse curvature of a tire is defined by the particular value of the ratio between the distance ht from the outside of the tread to the line b-b passing through the edges C of the tread, measured on the equatorial plane X-X, and the distance wt measured along the cord of the tire between the said edges, and in tires for two-wheeled vehicles it has a relatively high value, usually not less than about 0.15, being of the order of 0.3 in the case of rear tires and even higher (up to 0.45) in the case of front tires, as compared with a value of less than 0.05 usually found in tires for motor cars.

In a known way, a tread 8 is applied to the belt structure 6, and this provides the contact between the tire 1 and the surface on which it travels.

In the present case, the turns 7a formed by the cord 7 in the rear tire (FIG. 3) are wound on an auxiliary supporting element 9 consisting essentially of an elastomeric sheet which is interposed between the belt structure 6 and the carcass ply 3 and is shaped according to the transverse curvature profile of the layer formed by the turns, as described in EP-B-718.122 in the name of the Applicant.

In the case of a tire for four-wheeled vehicles, there are present, in addition to the belt 6, 1 or 2 further belt strips, radially superimposed on each other, and formed from portions of rubberized fabric incorporating the metallic cords according to the present invention, which lie parallel to each other in each strip and cross those of the adjacent strips, being preferably inclined in a symmetrical way with respect to the equatorial plane.

Preferably, in tires with a high transverse curvature (for motorcycles), the belt with the cords according to the present invention is used on its own to reinforce the tire, although it can act in combination with other belts of the same or other types, radially superimposed on each other.

Preferably, the filaments are made from steel with a carbon content in the range from 0.65% to 0.98%, and even more preferably every filament has diameters in the range from 0.12-0.35 mm, more preferably equal to 0.20 mm, although in other embodiments the filaments could have diameters differing from each other, provided that all of them are in the range from 0.12-0.35 mm.

In an example of preferred embodiment, the cord comprises 5 elementary filaments, sinusoidally waved in at least two different planes, preformed by bending, having a diameter in the range from 0.20 to 0.30, and wound together with a pitch of 18 mm.

The winding pitch of the filaments in the cord is in the range from 6 to 25 mm, preferably from 8 to 20 mm, and even more preferably from 10 to 18 mm.

The cord according to the invention is prepared by means of procedures and apparatus known to those skilled in the art. Reference is made, for example, to patent application WO 00/26465 (in the name of the Applicant), and therefore the corresponding descriptions are omitted for the sake of simplicity.

According to the invention, the rubberizing of the cord and its subsequent laying on the tire building wheel are carried out in predetermined conditions, in order to obtain the desired performance.

Preferably, the cord is not used on its own, but is incorporated in a strip (or "band") of elastomeric material which comprises 2 to 10 adjacent cords, laid in the longitudinal direction of the strip. The band is produced by feeding the predetermined number of cords, for example 3, and the rubberizing material to an extrusion head, through which said cords pass and are incorporated in the aforesaid strip which is produced by extrusion. Clearly, in the case of a single cord, the extrusion head extrudes a rubberized cord instead of a band.

It is specified here that, in the present description, the definition of "axially adjacent" turns of cords also comprises the case in which the cords are incorporated in the band and it is the turns of the band that are "axially adjacent".

According to the invention, the cords are rubberized with a pressure at the extrusion head less than that normally used for other types of cords, in other words a pressure of not more than 150 bars. On leaving the extrusion head, the resulting band is wound on to a collecting and dispensing roller.

During the process of laying on the building wheel, the collecting roller, or buffer, is connected to a pulling system (pulling capstan) providing a constant pull, which regulates the tension of the cord during the laying process. The pull is kept constant throughout the laying, including the starting stage, i.e. the beginning of the laying, in such a way that a constant calibrated tension, in the range from 30 N to 200 N according to the unwinding device used, is exerted on the band and, especially, on its component cords, in such a way that the peculiar structure of the aforesaid cords is not adversely affected in any way.

Conveniently, the radially outermost layer of cords of the belt structure of the rear tire is formed by a single cord or by a band comprising 2 to 5 metallic cords according to the invention, wound spirally on the said carcass, from one side of the said crown portion to the other, at a substantially null angle to the equatorial plane of the tire.

In the case of the front tire, the turns of cord of the radially outermost layer of the belt structure conveniently comprise metallic cords according to the invention, preferably distributed with a denseness progressively increasing from 3 to 6 cords/cm from the equatorial plane towards the edges of the belt.

The following table illustrates the characteristics of two cords (1 and 2) according to the invention, compared with two HE HT cords (3 and 4) according to the prior art, substantially having the same performance in terms of linear density and breaking load.

TABLE 1

| CHARACTERISTICS | 5 × 0.25 1 | 3 × 3 × 0.175 HE HT 3 | 5 × 0.30 2 | 3 × 4 × 0.20 HE HT 4 |
|---|---|---|---|---|
| Pitch (mm) | 18 S | 3.15/6.3 S/S | 18 S | 3.15/6.3 S/S |
| Cord diameter (mm) | 0.86 | 0.86 | 1.07 | 1.09 |
| Linear density (g/m) | 1.99 | 1.815 | 2.90 | 3.2 |
| Breaking load(*) (N) | 620 | 595 | 916 | 930 |
| Breaking stress(*) (MPa) | 2526 | 2748 | 2592 | 2466 |
| Elongation at break(*) (%) | 5.30 | 2.63 | 6.49 | 2.5 |
| Elongation between 2.5/50 N(**) | 0.48 | 1.21 | 0.345 | 1.5 |

(*)BISFA - ibid. - method E6
(**)BISFA - ibid. - method E7

Unexpectedly, the cords according to the invention have an elongation at break which is much greater than that of the equivalent prior art cords. As Table 1 shows, example cords 1 and 2 exhibit between 5.30% and 6.49% elongation at break.

A cord according to the present invention and four different prior art cords were subjected to a test of elongation to break before being rubberized. The results were processed according to the integral $$I(\varepsilon) = \int_0^\varepsilon \sigma(\varepsilon) d\varepsilon^*$$

wherein $\varepsilon$ is the elongation,
$\sigma(\varepsilon)$ is the stress in the filaments corresponding to the elongation,
$\varepsilon^*$ is the integration variable, and $I(\varepsilon)$ is the integral of the breaking stress.

The physical significance of the integral represents the total energy absorbed by the cord during the period of elongation until it breaks.

Figure 5:
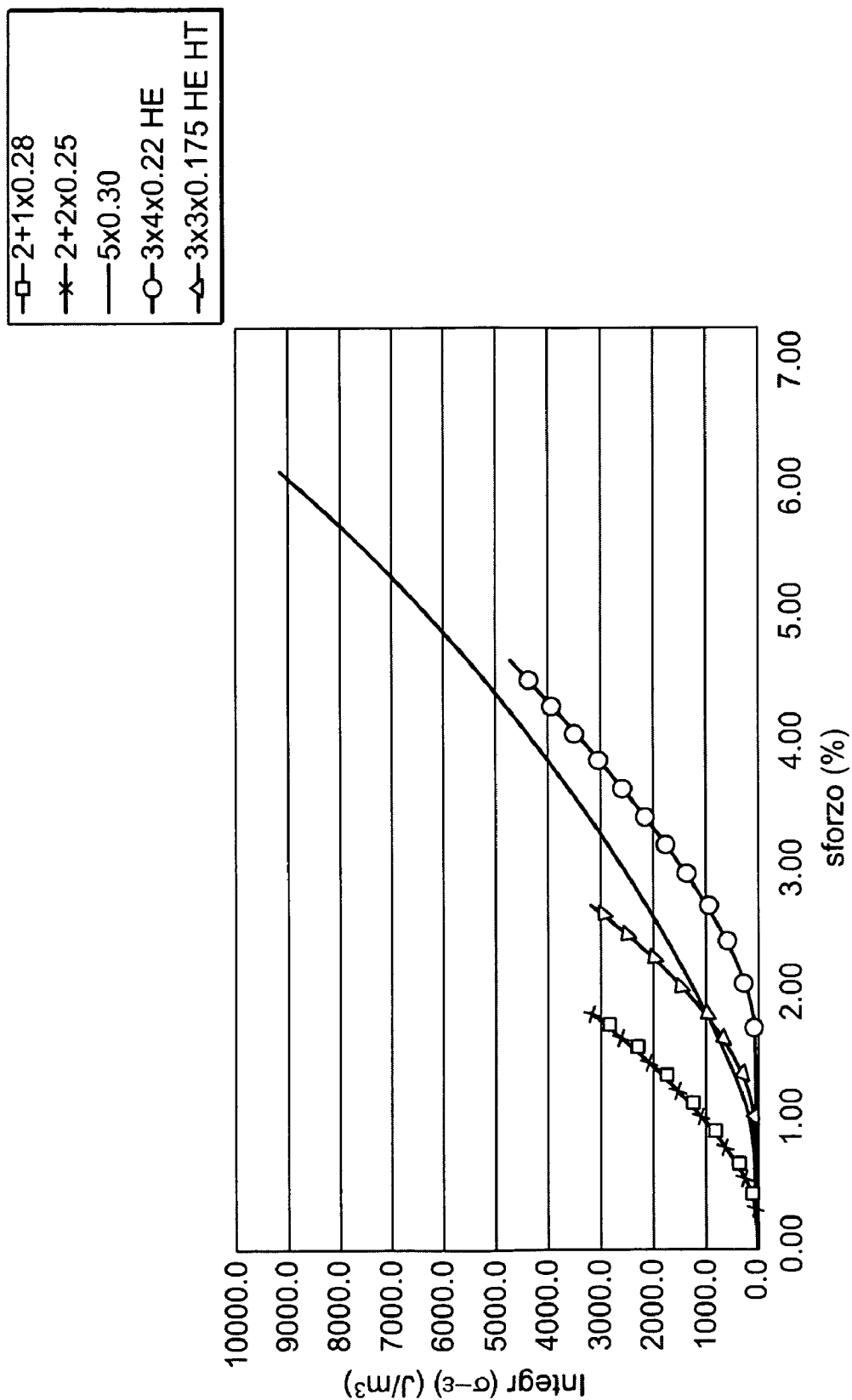
FIG. 5 shows the curve of the integral of stress/elongation of a cord according to the invention, compared with those of some known cords.

The above integral was used to plot (FIG. 5) the stress/elongation curves of a 5×0.30 cord according to the invention and of 2+1×0.28, 2+2×0.25, 3×4×0.22 HE and 3×3×0.175 HE HT cords according to the prior art.

The cord according to the invention shows surprisingly high values of the said integral; in this specific case, it reaches its breaking point at values of more than 9000 J/m³, while the known cords break before reaching values of the order of 5000 J/m³.

In order to evaluate the results achieved by using the cord according to the invention in tires for two-wheeled vehicles, a series of tests was carried out on a test track, by comparing a pair of tires according to the invention with a pair of equivalent standard tires produced by the Applicant, the same vehicle being used in both cases. The tires which were compared were built as described with reference to FIG. 3, and were fully identical to each other excepting for the radially outermost belt layer with cords arranged circumferentially (at 0°). In particular, in both pairs of tires the carcass were made of rubberized fabric with rayon cords, having 2 plies in the case of the front tire, and one ply in the case of the rear tire. In the pair of tires according to the invention, said radially outermost belt layer was provided with 5×0.30 cords in the front tire and with 5×0.20 cords in the rear tire. In the pair of control tires, said belt layer was provided with the known 3×3×0.20 HE HT metallic cords.

| Motor cycle | Honda CBR 600 R |
| --- | --- |
| Pirelli Dragon Evo racing tire | |
| Front tire: | |
| class | 120/70 ZR 17 |
| inflation pressure | 2.1 bars |
| rim | 3.50-17 |
| Rear tire: | |
| class | 180/55 ZR 17 |
| inflation pressure | 1.9 bars |
| rim | 5.50-17 |

The track test consisted in measuring the time taken to complete one circuit by the above motor vehicle, ridden on successive occasions by the same rider, when the motor vehicle was fitted first with the pair of standard production tires and then with the pair of tires according to the invention.

The track, of the so-called "slalom type" consisted of a sequence of curves, reverse curves and straight sections, along a predetermined route.

The result of the test showed a significant reduction in the time taken to travel around the track when the tires according to the invention were fitted.

In fact, it was found that the time taken for the journey by the motor vehicle fitted with the pair of tires according to the invention was reduced by 80 hundredths per circuit, by comparison with the same vehicle fitted with the pair of control tires; more precisely, it was found that the motor vehicle fitted with the tires according to the invention completed one circuit of the track in the time of 1'20"25 (one minute, 20 seconds and 25 hundredths of a second), as against the time of 1'21"05 for the control tires.

Table 2 below shows the result of the comparison in respect of other aspects of performance between the pair of tires according to the invention, indicated by A, and the known tires, indicated by B.

The points rating shown in Table 3 is subjective, being dependent on the rider's assessment. The points were awarded on a scale from 1 to 10, the maximum points being awarded to the pair of tires which showed the best performance in respect of each characteristic considered.

It can be seen that the pair of tires according to the invention has a performance level substantially equal to or even better than that of the pair of control tires, but with a clear and significant increase in respect of the "contact feeling", in other words the better sensation of safety which was desired.

TABLE 2

| TEST/TIRES | A | B |
| --- | --- | --- |
| RIDING BEHAVIOUR | 10 | 9 |
| IMPACT ABSORPTION | 10 | 9 |
| DIRECTIONAL STABILITY | 10 | 10 |
| BRAKING BEHAVIOUR | 10 | 9 |
| COMFORT | 10 | 10 |
| CONTACT FEELING | 10 | 8 |

These results are achieved, although to a lesser extent, in a vehicle fitted with only one tire according to the invention, especially the rear tire, but the combined effect of the pair of tires gives better results.

Table 3 below shows the characteristics of the cords according to the invention (b, c and d) after rubberizing. The data for an equivalent prior art cord (a) are provided for comparison.

TABLE 3

| Cord | Breaking Stress (N) | Linear density (g/m) | Quantity of steel in the tire (g) |
| --- | --- | --- | --- |
| a) 3 × 4 × 0.20 HE | 915 | 3.26 | 245 |
| b) 5 × 0.30 | 916 | 2.9 | 215 |
| c) 5 × 0.25 | 620 | 1.99 | 145 |
| d) 4 × 0.30 | 752 | 2.29 | 170 |

The cord according to the present invention makes it possible to reduce the weight of metal by at least 40%, with a reduction of less than 20% in the breaking stress, this decrease being acceptable in view of the high value of the safety factor used in the tires. Moreover, because of the characteristics of this type of cord, the quantity of material used for rubberizing these cords is less than that required for the known cords, and consequently there is a further reduction of the weight and cost of the tire.

The invention claimed is:

1. A tire for a vehicle wheel, comprising:
   at least one metallic reinforcing cord comprising a single strand of elementary filaments preformed by sinusoidal waving and wound together;
   wherein a number of the filaments in the at least one reinforcing cord is 5,
   wherein a diameter of each filament is greater than or equal to 0.25 mm and less than or equal to 0.30 mm,
   wherein a linear density of the at least one reinforcing cord is greater than or equal to 1.99 g/m and less than or equal to 2.90 g/m,
   wherein a value of an integral of a breaking stress of the at least one reinforcing cord is greater than or equal to 5,000 J/m$^3$, and
   wherein an elongation of the at least one metallic reinforcing cord at break is greater than or equal to 5.30% and less than or equal to 6.49%.

2. The tire of claim 1, wherein the at least one reinforcing cord is disposed at a substantially-null angle with respect to an equatorial plane of the tire.

3. The tire of claim 1, wherein the filaments of the at least one reinforcing cord are preformed by bending.

4. The tire of claim 3, wherein the filaments of the at least one reinforcing cord are also preformed by torsion.

5. The tire of claim 1, wherein the filaments comprise steel comprising a carbon content greater than or equal to 0.65% and less than or equal to 0.98%.

6. The tire of claim 1, wherein each filament comprises a same diameter.

7. The tire of claim 1, wherein at least two filaments comprise diameters different from one another.

8. The tire of claim 1, wherein each filament comprises a diameter of 0.25 mm.

9. The tire of claim 1, wherein each filament comprises a diameter of 0.30 mm.

10. The tire of claim 1, wherein the filaments are wound with a pitch equal to 18 mm.

11. The tire of claim 1, wherein a diameter of the at least one reinforcing cord is greater than or equal to 0.86 mm and less than or equal to 1.07 mm.

12. The tire of claim 1, wherein a diameter of the at least one reinforcing cord is equal to 0.86 mm.

13. The tire of claim 1, wherein a diameter of the at least one reinforcing cord is equal to 1.07 mm.

14. The tire of claim 1, wherein a density of the at least one reinforcing cord is greater than or equal to 30 cords per decimeter and less than or equal to 100 cords per decimeter.

15. The tire of claim 1, wherein the number of the filaments is equal to 4.

16. The tire of claim 1, wherein the number of the filaments is equal to 5.

17. The tire of claim 1, wherein the at least one reinforcing cord comprises five elementary filaments,
wherein each filament is sinusoidally waved in at least two different planes,
wherein each filament is preformed by bending,
wherein each filament comprises a diameter greater than or equal to 0.20 mm and less than or equal to 0.30 mm, and
wherein the filaments are wound together with a pitch equal to 18 mm.

18. The tire of claim 1, wherein the value of an integral of a breaking stress of the at least one reinforcing cord is greater than or equal to 9,000 J/m$^3$.

19. The tire of claim 1, wherein the value of the breaking load for the at least one metallic reinforcing cord is 620 N-916 N.

20. The tire of claim 1, wherein:
the value of the breaking load for the at least one metallic reinforcing cord is 916 N; and
the elongation of the at least one metallic reinforcing cord at break is 6.49%.

21. A two-wheeled vehicle tire, comprising:
at least one metallic reinforcing cord comprising a single strand of elementary filaments preformed by sinusoidal waving and wound together;
wherein a number of the filaments in the at least one reinforcing cord is 5,
wherein a diameter of each filament is greater than or equal to 0.25 mm and less than or equal to 0.30 mm,
wherein a linear density of the at least one reinforcing cord is greater than or equal to 1.99 g/m and less than or equal to 2.90 g/m,
wherein a value of an integral of a breaking stress of the at least one reinforcing cord is greater than or equal to 5000 J/m$^3$;
wherein an elongation of the at least one metallic reinforcing cord at break is greater than or equal to 5.30% and less than or equal to 6.49%; and
wherein a density of the at least one reinforcing cord is greater than or equal to 30 cords per decimeter and less than or equal to 100 cords per decimeter.

22. The tire of claim 21, wherein, in a tire for front-mounting, a density of the at least one reinforcing cord is greater than or equal to 2 cords/cm and less than or equal to 6 cords/cm.

23. The tire of claim 21, wherein, in a tire for front-mounting, a maximum, density of the at least one reinforcing cord is about 6 cords/cm.

24. The tire of claim 21, wherein, in a tire for front-mounting, a density of the at least one reinforcing cord varies.

25. The tire of claim 21, wherein, in a tire for front-mounting, a density of the at least one reinforcing cord progressively increases from an equatorial plane of the tire toward side edges of a belt structure of the tire.

26. The tire of claim 21, wherein, in a tire for rear-mounting, a maximum, density of the at least one reinforcing cord is about 10 cords/cm.

27. The tire of claim 21, wherein, in a tire for rear-mounting, a density of the at least one reinforcing cord is constant.

28. The tire of claim 21, wherein the at least one reinforcing cord is incorporated in a strip of elastomeric material.

29. The tire of claim 28, wherein the strip of elastomeric material comprises greater than or equal to two reinforcing cords and less than or equal to ten reinforcing cords.

* * * * *